Figure 1:
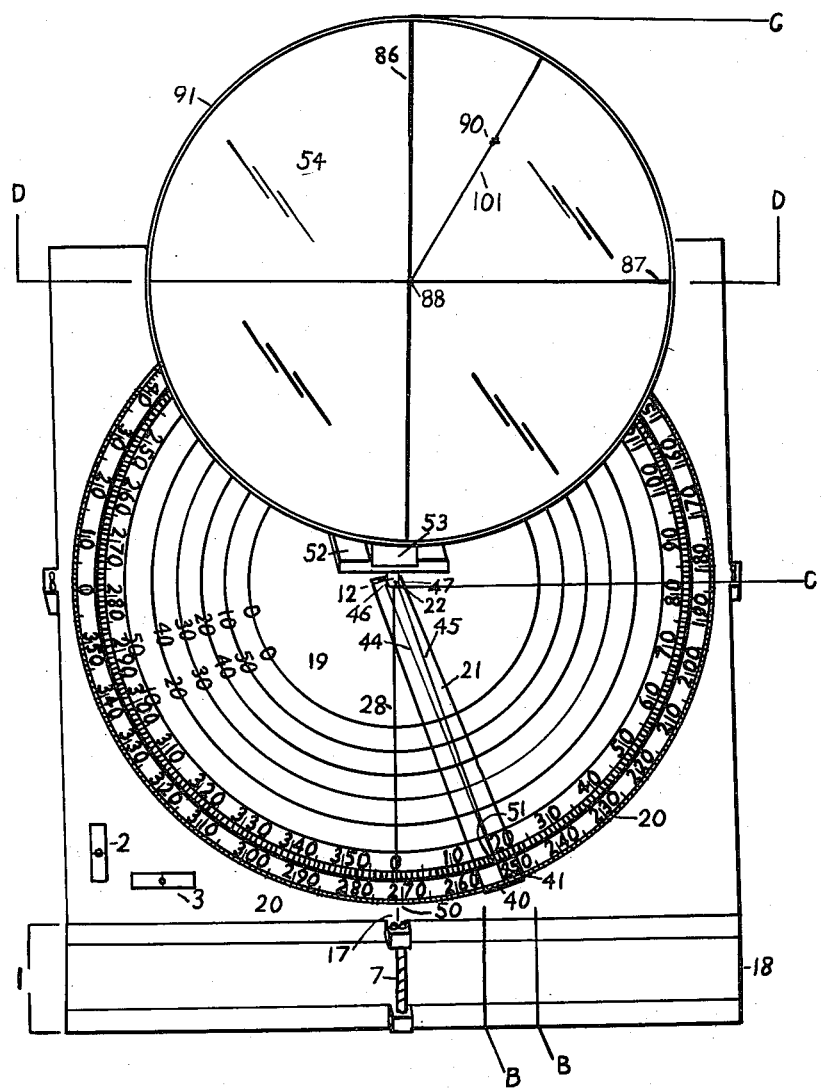

Feb. 14, 1961   F. B. GUTHRIE, JR   2,971,428
GREAT CIRCLE GUIDE
Filed Feb. 6, 1958   5 Sheets-Sheet 1

INVENTOR.
Francis Byron Guthrie Jr.
BY

Feb. 14, 1961  F. B. GUTHRIE, JR  2,971,428
GREAT CIRCLE GUIDE

Filed Feb. 6, 1958  5 Sheets-Sheet 2

INVENTOR.
Francis Byron Guthrie Jr.
BY

Feb. 14, 1961 F. B. GUTHRIE, JR 2,971,428
GREAT CIRCLE GUIDE
Filed Feb. 6, 1958 5 Sheets—Sheet 5

INVENTOR.
Francis Byron Guthrie Jr.
BY

2,971,428
GREAT CIRCLE GUIDE

Francis Byron Guthrie, Jr., Philadelphia, Pa.
(724 Anderson Ave., Drexel Hill, Pa.)

Filed Feb. 6, 1958, Ser. No. 713,735

1 Claim. (Cl. 88—2.4)

This device relates to an aeronautical instrument for the practice of celestial navigation and pertains specifically to great circle flying.

Celestial navigation seeks to determine position by reference to celestial bodies, in this instance a star.

Does the earth revolve? Yes it does. How do we know? A mirror alined to reflect the image of a star discloses with the passage of time that same star straying from the line of sight. To bring it to view again we must change the position of the mirror or change our line of sight. It follows then, to perceive accurately this motion of the earth as illustrated by a star image indicating the relative movement of the celestial sphere, the mirror must be fixed; the line of sight with regard to this fixed position constant, the only interdependence between the two being one of position; therefore, an independent eyepiece is optimum.

Suppose the mirror is in movement over the face of the earth. The curvature of the earth is approximately 8" per mile, that of the celestial sphere so great, the earth by comparison is merely a point therein; consequently, light rays from any star are the same for any position on the earth's surface when viewed with relation to a constant reference. This reference, an artificial horizon, may be established by various means, gyroscopic, bubble, etc. For purposes of illustration I have selected the bubble; however, a correct bubble horizon is subject to a predictable error due to the rotation of the earth, or if you like, rotation about the polar axis which varies with latitude and ground speed, or true air speed. The correction, known as coriolis is set forth in the Air Almanac, in many navigation manuals, etc., is applied to the right of track in the northern hemisphere and to the left in the southern hemisphere. If the movement across the face of the earth is to be considerable, involving perhaps rotation about a great circle axis the mean coriolis correction is practical, for the correction varies little at the same speed for wide latitude changes. Positioning the face of the mirror to displace the star image to the left or right the angular amount required by coriolis correction is the method used to correct for these rotations; they are angular and in a horizontal plane.

Ingenious applications of a fixed plane reflector are practicable, effectuated by the fundamental truth that light rays from any star are the same for any position on the earth's surface. For example: If the center of the mirror is set for the altitude and azimuth of a star at a selected future time considered at the point of destination, selection of the proper line of sight within the mirror's finite range will bring the star to view from positions far distant.

With the star image in view, a rotatable radius on the mirror's surface positioned to bisect the star will establish a guide for a great circle course to destination. This is perhaps easier understood by assuming a star with the same declination as destination is in view. The azimuth at destination in this instance is unchanging if the star is rising, or setting; however, the computed altitude of the star at destination is changing ascribable to the rotation of the earth and relative motion of the celestial sphere; to allow for the earth's rotation with the passage of time the mirror must be set for the altitude at destination at a selected future time, the time interval determined by speed of travel and accuracy required. To make a great circle course good it is only necessary to alter heading to keep the star bisected by the rotatable radius on the mirror's face as corrections for any other variables are inherent in the act.

A great circle course is the shortest distance between two points on the earth's surface.

In the past to fly a great circle course by compass was not considered because of a continually changing true heading. It became the practice to fly chords of a great circle course with a minimum of changes in true heading.

At present with automatic pilots requiring a minimum effort to change heading a continually changing true heading is a minor problem when considered with respect to the economy effected in time and distance. Increasing speeds and ranges of aircraft increase the desirability of a true great circle course.

One of the objects of this invention is to provide a means of taking full advantage within the limits of this device of a true great circle course.

Another object is to overcome the limitations imposed on electronic methods by distance, atmospheric, and/or other disturbances.

With the preceding objects in view this invention concerns a device that determines a great circle course, provides a visual reference of the course to be made good, and provides a visual reference when desired of the aircraft's position along that great circle course.

The invention in general results from the combination of means to establish a great circle component at the computed altitude and azimuth of a selected star as solved for destination; and by bisecting the star image establish the reference for a great circle course for the entire flight.

Figure 2:
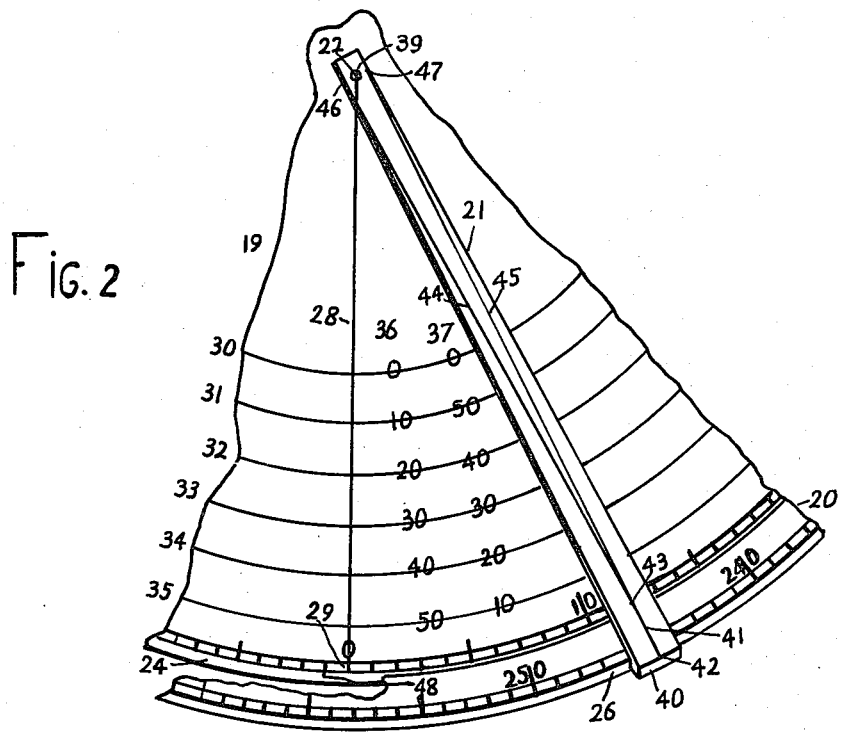
Figure 3:
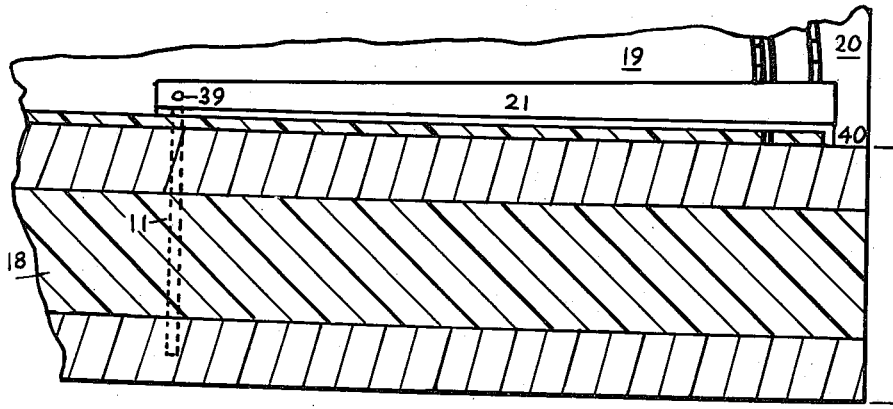
Figure 4:
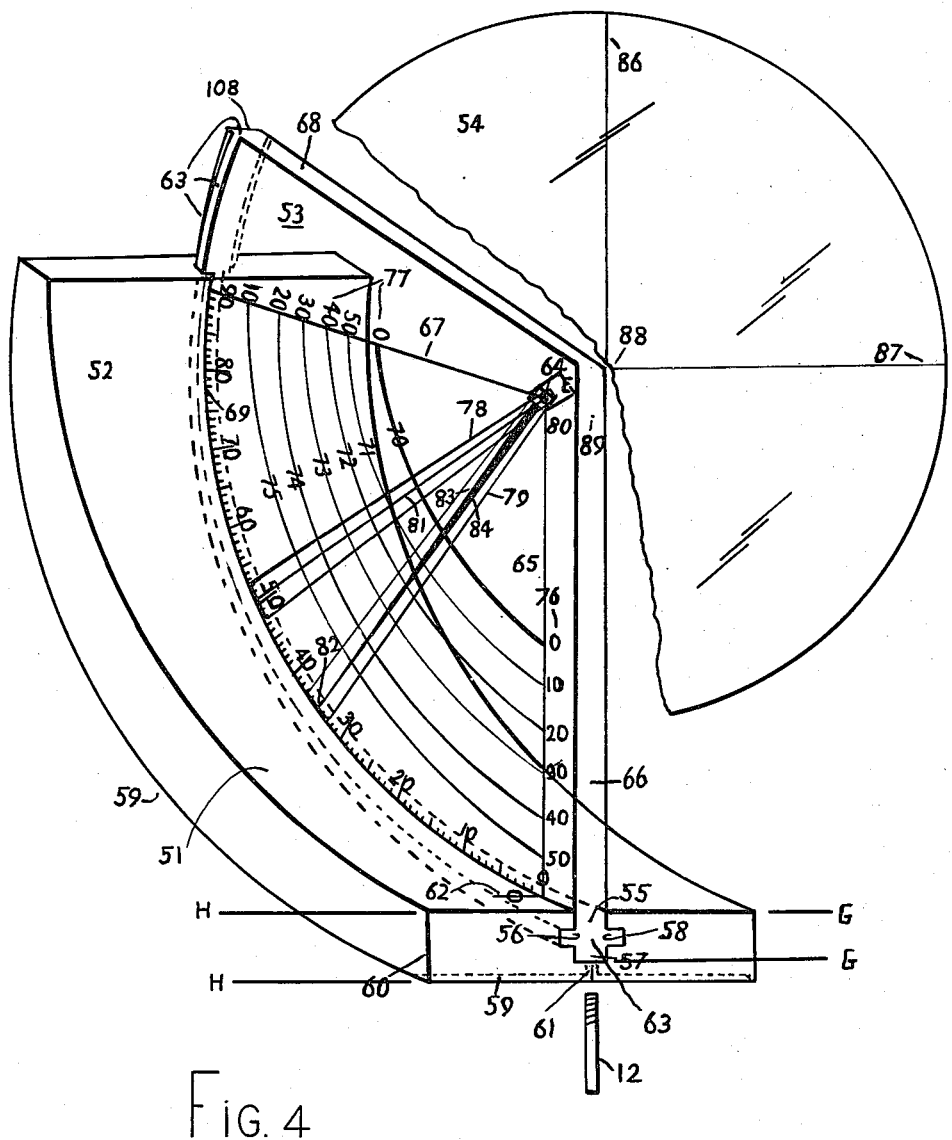
Figure 5:
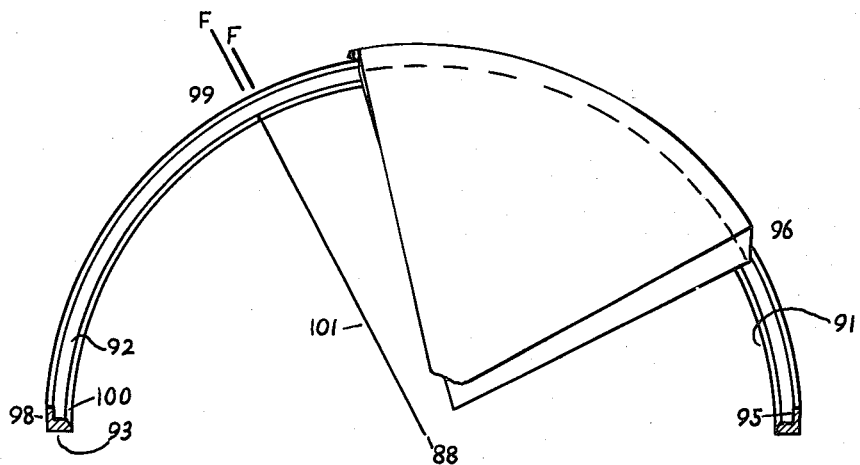
Figure 6:
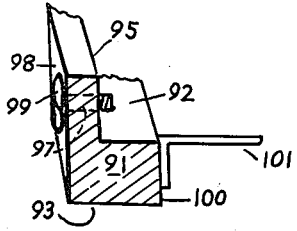
Figure 7:
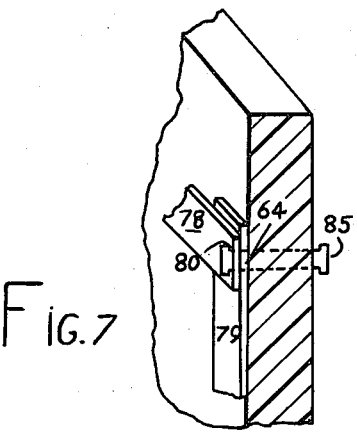
Figure 8:
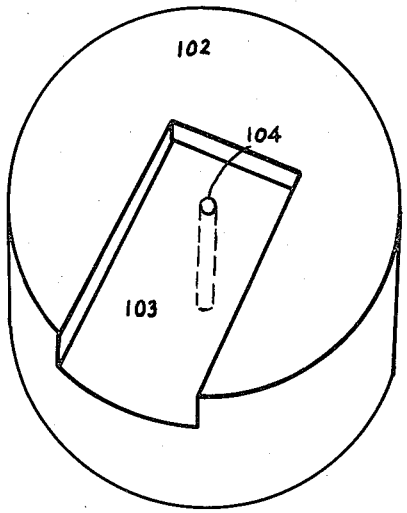
Figure 9:
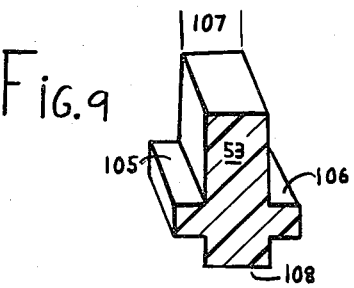
Figure 10:
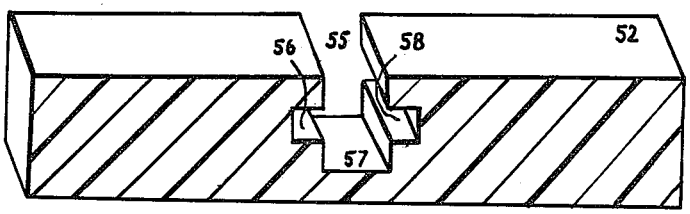

With the preceding paragraph in mind reference is now made to the accompanying drawings, and following specifications:

Fig. 1 is a front view embodying the invention.
Fig. 2 is partial enlarged view of Fig. 1.
Fig. 3 is a sectional view taken on lines B—B Fig. 1.
Fig. 4 is a side view taken on the line C—C Fig. 1.
Fig. 5 is an enlarged view taken on line D—D Fig. 1 as viewed from the back.
Fig. 6 is a sectional view taken on line F—F Fig. 5.
Fig. 7 is a sectional view taken on line E—E Fig. 4.
Fig. 8 is a bottom view of grommet illustrating pocket.
Fig. 9 is a sectional view of any position throughout mirror support taken on lines G—G Fig. 4.
Fig. 10 is a sectional view of any position throughout quadrant taken on lines H—H Fig. 4.

Referring to the drawings by numbers of reference, Fig. 1, the apparatus is seated on a base 1 that is provided with levels 2, 3, and a resilient, compressible insert 18 permitting leveling of upper plate by means of bolts 7, 8, 9, 10 (8, 9, 10, not shown), said base containing a vertical bore 11 (not entirely through Fig. 3) at exact center of this base unit serving to seat apparatus by means of pin 12, and a reference line 17, as a reference for alinement with the longitudinal axis of the aircraft. This base 1 may be of any suitable type, leveling mechanisms being well known, as the specific base detailed is for illustration only.

Pin 12 (Figs. 1 and 4) is a round metal pin containing external threads at one end, and is of such a diameter to fit in bore 11 at center of base 1 in a vertical position with a minimum tolerance that allows turning of said pin 12 without binding. (Read paragraph entitled "Operation" at end of specification to determine length of pin 12.) Pin 12 serves primarily to support quadrant 52 (Fig. 4), and in a secondary manner to position bearing rings 19, 20, and radius arm 21 (Figs. 1, 2, 3), next to be described. The method used may be any suitable one as the specific method detailed is for illustration only.

The base 1 (any suitable base) with pin 12 in place is now properly arranged to receive inner bearing ring 19, outer bearing ring 20, radius arm 21, and rubber grommet 102 (Fig. 8).

Bearing rings 19 and 20 (Figs. 1, 2, and 3) are composed of plastic, metal, or other suitable substance, are of the same thickness and uniform throughout. These two bearing rings 19 and 20 are separate and concentric and may be rotated one within the other each in an independent manner with a minimum clearance between the two sufficient to prevent binding. Bearing ring 19 is of one piece and contains a bore 11 (Fig. 3) at exact center identical with that bore 11 in base 1 (Figs. 1 and 3) which serves to admit pin 12 and center bearing ring 19 on upper plate of base 1 (Fig. 1), which in turn centers bearing ring 20 whose outer diameter is less than the minimum width of upper plate of base 1, and such that visual indication 17 (base 1—Fig. 1) is not obscured. Each bearing ring 19 and 20 is marked indelibly on its upper face in 360 equal divisions along the respective outer circumference with each 1°, each 5°, and each 10° division distinguished by the same length in respect to the same divisions, and distinguished by a different length in respect to the other divisions, as illustrated by Fig. 1. Each ten degree division having assigned a numerical value 0° thru 360°. The numerical values of inner bearing ring 19 ascending in value by intervals of ten in a counterclockwise direction, and the numerical values of outer bearing ring 20 ascending in value by intervals of ten in a clockwise direction. Bearing ring 19 (Fig. 2) only, in addition to the aforementioned markings has the following: a black indelible straight line 28 (Fig. 2) originating at the exact center 22 of inner bearing ring 19, but starting visually at the edge of bore 11 (Fig. 3) and extending to the outer edge 24 of bearing ring 19 to a point 29 that coincides with the division of angle marked as zero. (This line 28, in conjunction with radius arm 21, next to be described, serves in positioning inner bearing ring 19 with respect to outer bearing ring 20 by degrees of angle.) The marking of bearing ring 19 is continued as follows: along line 28 (Fig. 2) from the center 22 using as a radius the position midway between the center 22 and outer edge 24 a black indelible circle 30 is marked. The distance remaining along line 28 from circle 30 to outer edge 24 is noted in five equal intervals and using each as the radius from center 22 five black indelible circles 31, 32, 33, 34, 35, are marked (Figs. 1 and 2.) Each is distinguished by its respective numerical value as illustrated by Fig. 2. Column 36 in black indelibly and column 37 indelibly in red. These indelible circles 30, 31, 32, 33, 34, 35 (Fig. 2) in conjunction with radius arm 21 (next to be described) serve in positioning inner bearing ring 19 by ten minute intervals of one degree of angle.

Radius arm 21 (Fig. 2) is composed of transparent plastic, rigid in structure, and has near one extremity and on the center line a bore 39 (Fig. 3) which is identical with that bore in base 1 (Fig. 1). Radius arm 21 (Fig. 2) is of a length to extend from center 22 of bearing ring 19 (when bore in each is alined) to contain by a lip 40 (Figs. 2 and 3) bearing ring 20, said lip 40 (Fig. 2) conforms with outer edge 26 of bearing ring 20 as illustrated. Radius arm 21 (Fig. 2) is marked as follows: A black indelible line from point 42 (centered on upper surface of radius arm 21 at edge) to point 43 (a point on center line of radius arm 21 that coincides when positioned as illustrated by Fig. 2 with outer edge 24 of bearing ring 19). This line 41 is in effect a graphic representation of a part of the center line of radius arm 21, and functions as a pointer between the two bearing rings 19 and 20 to coincide values of each. The marking of radius arm 21 is continued as follows: From point 43 two straight indelible lines 44 in red, 45 in black, each terminating at points 46 and 47 respectively, said points 46 and 47 each the distance of one degree to the left and right respectively of exact center line of radius arm 21 (the distance of one degree as measured along upper face at edge along circumference of bearing ring 19) so that the two points 46 and 47 and center of bore 39 are in a straight line at right angles to longitudinal center line of radius arm 21. These lines 44 and 45 in conjunction with concentric rings 30, 31, 32, 33, 34, 35, of bearing ring 19 serve to establish ten minute intervals of one degree of angle with respect to bearing ring 19 in the following manner: If radius arm 21 (Fig. 2) is figuratively moved to the left until point 43 coincides with 48 (359°), line 28 (on bearing ring 19) will be intersected by line 45 (on radius arm 21) at circle 30 (numerical value zero). If radius arm 21 is held in this position and bearing ring 19 figuratively moved to the left the intersection of line 45 with line 28 will move from ring 30 to ring 31, 32, 33, 34, 35, in that order establishing 359° plus ten minute intervals of one degree of angle. To determine intervening minutes between each ten minute interval interpolate between rings depending on intersection of line 45 with line 28. For example: If line 45 intersects line 28 midway between rings 32, 33 (which have numerical values in black of 20 and 30 respectively), the angle established at 359°25′. When point 43 (on radius arm 21) coincides with point 29 on bearing ring 19 the angle established is zero. If radius arm 21 is held in this position and bearing ring 19 figuratively moved to the left the intersection of red line 44 (on radius arm 21) with line 28 (on bearing ring 19) will move from ring 35 (marked in red with a numerical value of 10) to 34, 33, 32, 31, 30, in that order establishing zero degrees plus ten minute intervals of one degree of angle. To determine intervening minutes between each ten minute interval interpolate between rings depending on intersection of red line 44 with line 28. For example: If red line 44 intersects black line 28 midway between circles 33, and 32 (marked with numerals 30 and 40 respectively), the angle established is 0°35′. To summarize: If the angle (as indicated by upper surface along outer edge of inner bearing ring 19) is decreasing use black line 45 and black numerals of column 36 in conjunction with line 28. If angle is increasing use red line 44 and red numerals (column 37) in conjunction with line 28. Means of moving and positioning the two concentric bearing rings 19 and 20, and radius arm 21 (detailed in this and the paragraph preceding) may be any suitable means as the specific method explained is manual and serves primarily to illustrate their respective interdependence of movement concerning angular determinations.

Rubber grommet 102 (Fig. 8—bottom view) contains a pocket 103 to receive top of radius arm 21 snugly; also a bore 104 of such a diameter that pin 12 (Figs. 1 and 4) which passes through this grommet will be gripped securely. Function of this grommet when pressed down into position is to coordinate radius arm 21 and pin 12. Means of coordinating radius arm 21 and pin 12 may be any suitable means, as the specific method detailed serves only to point out the selective locking means desired.

With the three paragraphs preceding in reference to bearing rings 19 and 20 in mind, also radius arm 21 and grommet 102, these components are assembled by placing one ring 19, within the other 20, the radius arm 21 on top with lip 40 of same containing outer ring 20, and as a unit laid flat on base 1 (Fig. 1) with pin 12 passing through bore in bearing ring 19 and radius arm 21. Rubber grommet 102 is pressed on pin 12 in such a manner that part of end of radius arm 21 fits in pocket in grommet 102. The function of these components collectively is as follows: Bearing ring 19 serves in a secondary manner to establish bearing ring 20. Radius arm 21 serves in a secondary manner to contain bearing ring 20. The primary function of outer bearing ring 20 is to establish a visual numerical reference 50 with respect to degrees of angle in conjunction with true heading (visual indication 17—Fig. 1). The primary function of inner bearing ring 19 in conjunction with radius arm 21 is to establish a visual numerical reference 51 with respect to degrees and minutes of angle in conjunction with outer bearing ring 20. The primary function of radius arm 21 in conjunction with bearing rings 19 and 20 is to coincide angular values of one ring with the other, and in conjunction with inner bearing ring 19 to establish a visual reference with respect to minutes of one degree of angle.

The collective purpose of all components detailed in the seven paragraphs preceding is to provide a base that may be leveled with variable visual angular references in degrees and minutes of angle 0° thru 360°, and the collective function is to support in a vertical position indirectly by a pin a unit comprising a quadrant, adjustable mirror support with mirror attached (next to be described), which may be rotated by means of a radius arm zero through three hundred and sixty degrees in a horizontal plane. With this paragraph in mind reference is now made to Fig. 4.

Quadrant 52 is composed preferably of transparent plastic of a rigid structure and is to be of a width and thickness determined with symmetry in relation to the whole assembly (as illustrated by Figs. 1 and 4) as a guide. The length comprises 95° of arc. The inner curved surface which we may refer to as the top is channeled 55, 56, 57, 58 (Figs. 4 and 10) in and beneath the surface, each channel being uniformly on each side of longitudinal center line of quadrant 52, all channeling to be throughout the entire length, or 95° of arc. The outer curved surface 59, of quadrant 52, has on the longitudinal center line and near the forward edge 60, internal threading 61, to a depth that does not penetrate channel 57. This internal threading 61 is to receive externally threaded round pin 12 with a tight union, yet free enough that pin 12 may be turned in manually to the maximum depth. Internal threading 61 is as close to forward edge 60 as practical, yet eliminating the possibility of a rupture of the forward edge 60 by the weight of the whole assembly on round pin 12. Marked on the upper surface of quadrant and five degrees from and parallel to the the leading edge 60 in reference line 62 marked numerically as zero. This line 62 serves as a reference in positioning mirror support (next to be described) angularly from the horizontal. The function of quadrant 52 is primarily to hold and guide by means of channels 55, 56, 57, 58, mirror support 53.

Mirror support 53 (Figs. 4 and 10) is composed of one piece of transparent plastic, rigid in structure and formed as follows: Along an arc constructed from center 64 (Fig. 4) a length of 135°. Five degrees from one end of this arc a radius is drawn to the center 64. Adjacent side 66 is parallel to this radius and longer in that it extends five degrees (as measured along arc along circumference) beyond center 64. Adjacent side 68 meets this same point on a straight line from 135° of arc removed from side 66. Mirror support 53 is of uniform width with the exception of greater width (Fig. 9) abruptly at right angles 105, 106 (Fig. 9) which coincides with channels 56, 58 (Fig. 10) in quadrant 52. Uniform width aforesaid is resumed (abruptly at right angles) to edge of circumference 108. The uniform width 107 (Fig. 9) is determined by channel 55 (Fig. 10) in quadrant 52. The increase in width 105, 106 (Fig. 9) of mirror support 53 (Fig. 4) is determined by channels 56 and 58 (Fig. 10) so that portion of the main body of the mirror support adjacent to the circumference will ride in channels 55, 56, 57, 58, with minimum clearance so position of mirror support may be changed manually, but will not slip or slide with incidental vibration. The portion of the main body of mirror support adjacent to the circumference formed to coincide with channels in quadrant has that shape throughout the entire length, or 135°. Mirror support 53 is marked indelibly as follows: From the center 64 (used to determine 135° of arc) a line 65 (Fig. 4) in black terminating at a point five degrees from leading edge 66. This line terminates where formed end originates. The marking is continued. An indelible black line 67 (Fig. 4) is marked from center 64 and terminating 40° from trailing edge 68 where formed end originates. With mirror support 53 riding in channels 55, 56, 57, 58, of quadrant 52 (Fig. 4) an indelible line 69 is marked in black on mirror support 53 immediately above upper surface 51 of quadrant 52. This line 69 terminates at each end at its junction with lines 65, 67, and is indelibly marked in 90 equal divisions. Each 1°, each 5°, and each 10° division distinguished by the same length in respect to the same divisions, and distinguished by a different length in respect to the other divisions as illustrated by Fig. 4. Along line 65 (Fig. 4) from the center 64 using as a radius the position midway between the center 64 and line 69 a curve 70 is indelibly marked between lines 65 and 67. The distance remaining along line 65 from curve 70 to line 69 is noted in six equal intervals and using each as the radius from center 64 five curves 71, 72, 73, 74, 75 are indelibly marked between lines 65 and 67. These curves are assigned numerical values as illustrated by Fig. 4. The numerals in column 77 in red, and the numerals in column 76 in black. The purpose of all the aforesaid markings on mirror support 53 with assistance of reference line 62 and radius arms 78 and 79 (next to be described) is to establish mirror support 53 by degrees and minutes of angle with respect to quadrant 52. Form of quadrant and mirror support and means to hold and guide mirror support with respect to quadrant 52 as detailed in this and the paragraph preceding may be any suitable as the method detailed is for illustration only.

Radius arms 78, 79 (Fig. 4), are composed of transparent plastic rigid in structure and each have near one extremity and on the respective longitudinal center line a bore 80 (Figs. 4 and 7). Each radius arm 78, 79, is of a minimum width and of a length to extend when attached at center 64 (by pin through bore 80) to line 69. Radius arm 78 is indelibly marked as follows: A black line 81 coinciding with the longitudinal center line. This line serves merely as a reference. Radius arm 79 is indelibly marked as follows: From point 82 (a point at edge of radius arm 79 at center) two straight lines 83 in black, 84 in red, each terminating at points each the distance of one degree to the right and left respectively of the center of bore 80 (the distance of one degree as measured along line 69) so that the terminations of said lines and center of bore 80 are in a line at right angles to the longitudinal center line. The two radius arms 78 and 79 in conjunction with curves 70, 71, 72, 73, 74, 75, and reference line 62 (on quadrant 52) serve to establish mirror support 53 at degrees and minutes of angle in respect to quadrant 52. If angle is increasing use red line 84 (on radius arm 79) and red numerals in column 76. If angle is decreasing use black line 83 (on radius arm 79) and black numerals in column 77. For a clear understanding of the markings and procedure substitute figuratively radius arms 78 and 79 for line 28 (Fig. 2) and radius arm 21, and review explanation in the sixth paragraph preceding this one. The two radius arms 78 and 79 are attached at center 64 (Fig. 4) by round pin 85 (any suitable pin) so the two arms may be rotated independently manually but with sufficient restraint that they will not slip or slide once set as a result of incidental vibration. Means of attaching or representing radius arms 78, and 79, may be any suitable as the method detailed is for illustration only.

The preceding two paragraphs in part make reference to a mirror support of which the primary function is to support a mirror (next to be described) that may be established at degrees and minutes of angle 0° thru 90° from the vertical to the horizontal about a central position. With this in mind reference is now made to Fig. 1 and Fig. 4. The mirror is flat and circular, and of a minimum thickness, yet such that fraility is of no concern, and of a diameter governed by symmetry in relation to the whole assembly as a guide. The face of the mirror is marked finely and indelibly in white with two diameters 86, and 87, intersecting at right angles. The mirror is attached permanently or removably by any practical means to leading edge 66 (Fig. 4) of mirror support 53, so vertical center line of mirror coincides with vertical center line of leading edge 66, and horizontal center line of mirror would meet line 67 (Fig. 4) if extended when mirror support 53 is positioned with line 65 alined with zero on quadrant 52. The primary purpose of the mirror 54 is to make visible on its surface the image of a celestial body 90 (star).

Mirror 54 has riding on its surface immediately adjacent to the circumference, and on its circumference a mirror ring 91. The ring is composed of a light metal and formed along its inner surface as illustrated (Fig. 6) so surface 92 which is parallel to the base 93 of the ring, and uniform throughout will ride on the mirror's surface, and surface 95 which is uniform throughout the ring rides on circumference 96 of mirror in such a manner that ring may be rotated freely. One position along the ring contains interior threading 97 that penetrates from outer surface 98 thru surface 95 and serves to admit set screw 99 which may be operated manually to establish mirror ring 91 in the desired position. Attached permanently or interchangeably to the mirror ring on the inner surface 100 is a fine rigid wire 101 (or interchangeable component) preferably of a nature that it would spring back to its original position if disturbed. Rigid wire 101 as illustrated by Fig. 6 is cemented to mirror ring 91; however it is pertinent to point out that this is merely a substitute for the ultimate, that is; a light sensitive component with its resultant circuits, the same being well known and capable of automatic operation with respect to the aim of the invention, that is; to fly a great circle course by reference to a star. Rigid wire 101 is of a length that would extend to the exact center 88 of mirror 54 (Fig. 5), and be positioned to ride on the mirror's surface when mirror ring 91 is positioned on mirror's circumference. The purpose of mirror ring 91 is to hold fine rigid wire 101, (or other component), which in effect represents a rotatable radius of mirror 54. Any similar means of accomplishing this is acceptable. The purpose of the fine rigid wire 101 is to establish a reference that may be moved by means of the ring 91, so that some part of this reference (rigid wire 101, or substitute) bisects the image of a star. Replacement of this fine rigid wire 101 with another component sensitive to starlight is optional, as rigid wire 101 is for illustration only.

The components described in the five preceding paragraphs, that is, quadrant 52, mirror support 53, mirror 54, mirror ring 91, are assembled as follows: Mirror support 53 with mirror 54 attached is engaged into quadrant 52, and pin 12 (Fig. 4) placed earlier in base, is introduced into quadrant by means of threads. Great circle guide is now complete.

*Operation*

Star image is to be viewed from an independently fixed eyepiece, which is to serve merely as a constant reference for subsequent sightings. The direction of sight is that selected to view the star image. Radius arm 21 is set so that mirror and line 41 on radius arm 21 indicate same angle, that is, a line at right angles to the plane of the mirror coincides with line 41 on radius arm, and reference line 17 on base is alined accurately with the longitudinal axis of the aircraft. In straight and level flight on a heading toward destination degrees of angle on mirror support 53 (Fig. 4) having the same numerical value as known latitude (present geographic position) with correction obtained from Polaris (Pole Star) table in The Air Almanac, and index correction if any applied, is set at reference line 62 (Fig. 4). Mirror 54 is turned by means of radius arm 21 until the image of the North Star (Polaris) appears on mirror, and pin 12 is adjusted until horizontal diameter 87 bisects star image. This is preferably done as far from center of mirror as possible where effects of acceleration can be seen and visually averaged out. This adjustment represents correction for altitude, and pin 12 is of a length to allow for this correction. This done mirror is turned by means of radius arm 21 until North Star is bisected by intersection of cross hairs (diameters 86, 87). Outer bearing ring 20 is rotated until zero is alined with reference line 41 on radius arm 21. The solution for computed altitude and azimuth for the selected star (one that will be reflected advantageously throughout the flight, or intermediate destinations, with respect to changing computed altitude and azimuth of the star at destination) destination used as the geographic position is solved for a convenient time in the future (reset outer bearing ring to true north) and the degrees of angle as found on mirror support 53 (Fig. 4), having the same numerical value as computed angle, is set with index correction, if any, and refraction correction applied at reference line 62 on quadrant. Mirror is turned by means of radius arm 21 and set at azimuth as solved with mean coriolis correction applied (between present position and destination, which serves to correct for rotation about the polar axis) by means of line 41 on radius arm 21 with reference to outer bearing ring 20. Inner bearing ring 19 is rotated to bring zero to coincide with line 41 and grommet 102 is pressed down slightly locking radius arm 21 and inner bearing ring 19 in position. At the time used for the solution for computed altitude and azimuth mirror ring 91 is rotated until great circle component 101 bisects selected star. Effect of acceleration, that is, star image wavering on great circle component 101 is visually averaged out and mirror ring 91 is locked in position by means of set screw 99. The two adjustments, that is; azimuth, and mirror ring, once established are not changed during the flight.

Great circle component 101 has been set as explained in the preceding paragraph, and as a result great circle course is established. Keep base 1 level and alter aircraft's heading to keep selected star bisected by great circle component 101 until destination is reached, for by so doing you make a great circle course good, compensating for rotation about the great circle axis, drift resulting from wind, or both in the process.

It is suggested that other solutions for the computed altitude and azimuth be made at intervals during the flight for when computed altitude with index correction, if any, and refraction correction applied, is used to position mirror the relative position of aircraft (star image) in respect to destination (center of mirror) may be determined. The act of keeping star image superimposed on great circle component serves to compensate for speed of aircraft with respect to the relative motions of the earth and celestial sphere, also rotation of the earth about its axis.

In the northern hemisphere the North Star (Polaris) may be used; however the procedure is slightly different. The latitude of destination with correction obtained from Polaris (Pole Star) table in The Air Almanac, and index correction applied is used in lieu of computed altitude. The difference in longitude between present position and destination is applied to true North as an additive correction on flights to the West, or as a subtractive correction on flights to the East, with mean coriolis correction, to establish azimuth.

What is claimed is:

A great circle guide comprising a base, two concentric rings mounted thereon for rotation about a common vertical axis, said rings being independently rotatable with respect to said base and with respect to one another, each of said rings together bearing central concentric markings also indicia of degrees 0 through 360 on the outer edges thereof, a pin fitted in said base axially aligned with said vertical axis and extending through said rings for rotation about said axis, a radius arm fitted on said pin and overlying said rings for relative rotation with respect to said rings and said base, said radius arm embodying straight-line markings diverging and lying along the center line and functioning to point out coincidence one relative to the other of angular indicia and divisions thereof of underlying rings, surface levels on said base and a resilient compressible insert underlying as a means for leveling upper plate of said base, a fixed reference line on said base serving as a point of reference in the horizontal plane about the vertical axis common to the inner ring, outer ring, and radius arm as a means for each to establish angular relationships coordinately or independently thereto, a grommet fitted on said pin to, when pushed down, receive the top of radius arm snugly serving thereafter to coordinate pin and radius arm causing their turning as one, above said grommet and embodying a fixed reference line a quadrant of circular conformance through a total length of 95 degrees supported by aforesaid pin which threaded into the underside causes the two to rotate about the pin's axis of rotation as one, a mirror support of circular conformance through a total length of 135 degrees to turn about the pin-quadrant axis of rotation and mounted by means of channelled quadrant receiving correspondingly formed contours of mirror support as a means also to turn mirror support 90 degrees about the horizontal axis established by said movement, said mirror support embodying two radius arms overlying and movable one to the other each bearing straight line markings along and diverging from their respective center line, said markings in conjunction with underlying equidistant concentric markings and indicia of degrees of mirror support contributing with fixed reference line on aforementioned quadrant to establish angular relationships and divisions thereof between mirror support and quadrant, a flat circular mirror held indirectly by aforesaid quadrant by means of permanent or removable attachment to leading edge of mirror support and movable and establishable with mirror support 90 degrees about the horizontal axis established by mirror support's channelled travel, said mirror embodying on its surface by means of a mirror ring embodying a set screw a rotatable radius rotatable and fixable through 360 degrees, the axis of said rotation when mirror is established in the vertical a horizontal one intersecting and at right angles to the horizontal axis hereinbefore mentioned as determined by mirror support's channelled travel, said axis of rotatable radius giving way to diverse axes as the mirror is moved through 90 degrees by means of mirror support's channelled travel about the horizontal axis determined by said travel, means all hereinbefore pointed out for leveling said base to establish the pin vertical, for moving the mirror through 360 degrees about a vertical axis, for moving the mirror 90 degrees about a horizontal axis, for moving or fixing a rotatable radius on the face of said mirror 360 degrees about diverse axes from the horizontal to the vertical, for adjusting the mirror 360 degrees about the first mentioned vertical axis in accordance with the azimuth of a celestial body, for adjusting the mirror about the second mentioned horizontal axis in accordance with the computed altitude of a celestial body, for adjusting the rotatable radius 360 degrees about the third mentioned diverse axes and fixing it to bisect a star image brought into view on the mirror's surface, all the aforesaid means serving to establish the rotatable radius as a guide for a great circle course to be made good, this same great circle component thereafter through use of all the necessary interrelated functions contributing to its method of establishing a guide for the great circle path to be traveled is used in conjunction with a star image as a guide for the great circle course to be made good, as a means to establish relative position with regard to that great circle course, as a means to establish relative position with regard to destination.

References Cited in the file of this patent

UNITED STATES PATENTS 2,039,878 Boykow  ---------------- May 5, 1936